Jan. 4, 1938. A. G. LANGDON 2,104,658
CLUTCH AND REVERSE GEAR
Filed May 12, 1936 2 Sheets-Sheet 1

INVENTOR,
A. G. LANGDON.
BY
Blair T. Kilcoyne.
ATTORNEY

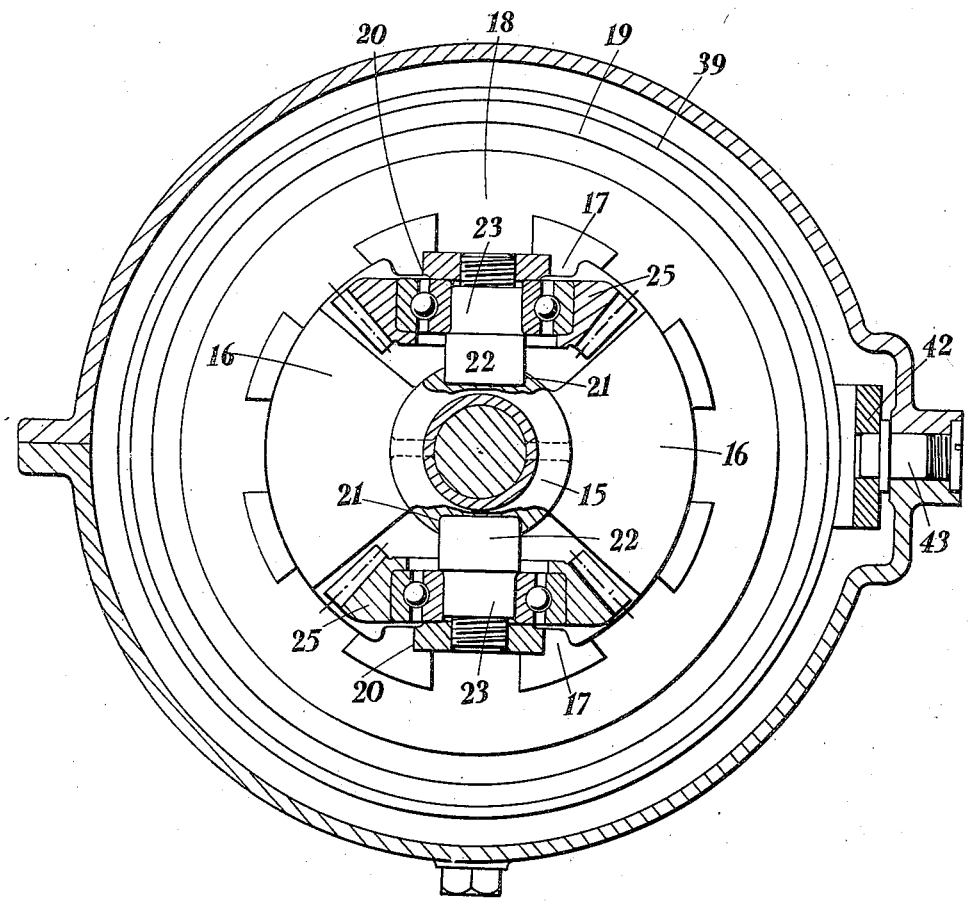

Patented Jan. 4, 1938

2,104,658

UNITED STATES PATENT OFFICE 2,104,658

CLUTCH AND REVERSE GEAR

Alfred George Langdon, Northam, Southampton, England, assignor to The Climax Rock Drill & Engineering Works Limited, London, England Application May 12, 1936, Serial No. 79,368
In Great Britain May 16, 1935

4 Claims. (Cl. 74—297)

This invention relates to improvements in or connected with clutch and reverse gears and more particularly, though not necessarily exclusively to clutch and reverse gears for marine application.

One of the objects of the present invention is to provide a clutch and reverse gear of the type including a reverse gear train of the sun-and-planet type in combination with means for selectively braking the planet wheel carrier and a clutch for instance of the multiple plate kind.

Another object of the present invention is to provide a clutch and reverse gear transmission unit of great simplicity and reliability.

A further object of the present invention is to provide a clutch and reverse gear transmission unit in which there are relatively few working parts.

Yet another object of the present invention is to provide a clutch and reverse gear transmission unit in which during forward running there is no load on the reverse gear train.

A still further object of the present invention is to provide a clutch and reverse gear transmission unit in which during operation of the unit and particularly during forward running there is no end thrust on the engine shaft to which the unit is coupled.

With the above and other objects which will appear from the following specification in view, the present invention resides in a combined clutch and reverse gear unit comprising a main driving assembly including a driving plate associated with clutch mechanism for transmitting forward drive and a gear wheel associated with gearing for transmitting astern drive, in combination with a main driven assembly also including a driven plate associated with said clutch mechanism and a gear wheel associated with said reverse gearing, said main driving assembly being connected to or adapted to be connected to the shaft of a power generator and said main driven assembly being connected to the driven shaft of the transmission unit.

The intermediate gearing of the reverse gear train is preferably supported in a carrier serving as part of the clutch mechanism e. g. a web portion of such carrier may be adapted to make driving engagement with the end plate of a series of clutch plates located on each side thereof, the outer plates of such series then making driving engagement with the aforesaid main driving and driven plates, said carrier being of course associated with suitable brake mechanism which is brought into operation during astern running of the mechanism.

A further characteristic feature of the present invention resides in the fact that during forward running of the transmission unit no load is applied to the reverse gear train, i. e. the intermediate wheels of this train could be removed without in any way preventing the proper forward running of the mechanism.

In order that my invention may be well understood I will now describe by way of example one embodiment thereof with reference to the accompanying drawings in which:—

Figure 2 is a cross sectional end elevation on the line I—I of Figure 1.

Figure 1:
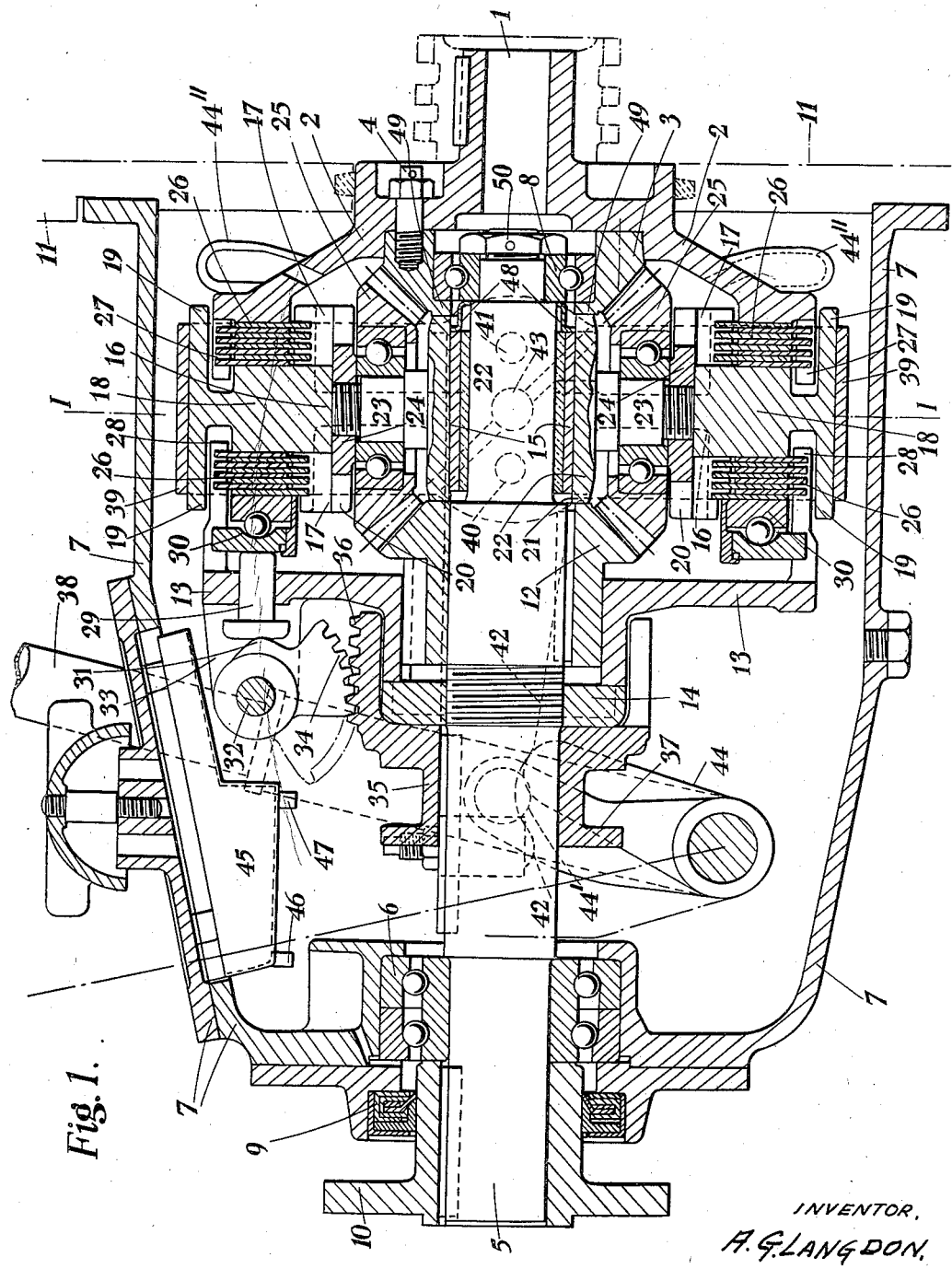
Fig. 1 is a cross sectional side elevation of the transmission unit.

Referring to the figures, 1 represents the main driving element of the unit and is adapted to make connection in any suitable way with a power source such for example as the shaft of an internal combustion engine. A main driving plate 2 is preferably formed integrally with said element 1 and a bevel wheel 3, constituting the main driving wheel of a reverse gear train is secured to said plate for instance by means of studs one of which, designated 4, appears in Figure 1.

The main driven shaft 5, extends right through the unit and has a bearing 6, preferably in the form of a ball or roller bearing, at one end of the casing 7 enclosing the transmission unit and the other end of said shaft 5 is spigoted in the main driving gear wheel 3, a bearing 8, preferably in the form of a ball or roller bearing, being also provided at this point.

The free end of the main driven shaft 5 passes through a gland or stuffing-box 9 in the casing 7 and may be provided with any suitable means such as the coupling 10, for making connection with the mechanism to be driven such for instance as a propeller shaft.

The forward end of the gear casing 7 may be bolted directly to the engine with which the transmission unit is associated, the chain lines 11 indicating for instance one of the engine plates.

A main driven gear wheel 12, in this example a bevel wheel, is keyed to the driven shaft 5 and a main driven plate 13 is splined or keyed on the hub of such wheel in such manner that it can slide axially therealong, the limit of movement towards the left in Figure 1 being determined by means of a back nut 14 screwed to the shaft 5.

A carrier unit is freely mounted on the shaft 5 between the above mentioned plates 2 and 13, such carrier having a hub portion 15, a web portion 16, an intermediate flanged portion 17, an enlarged annular portion 18 and a rim portion 19. The intermediate portion 17 is provided on its inner periphery with two grooves 20 at diametrically opposed points and grooves 21, 21 are provided in registration on the hub portion 15 of said carrier. Each of the grooves 21, 21 slidably engages the T-shaped head 22 of a trunnion pin 23 the ends of such pins making screw-threaded engagement with slippers 24, 24 slidable within the grooves 20, 20.

Bevel wheels 25, 25 are carried by said trunnion pins, preferably through the intermediary of ball or roller races, and serve as the intermediate gears between bevel wheels 3 and 12, i. e. they form the planet wheels of the reverse gear train. It will be readily appreciated that the web portion 16 of the carrier does not extend to the parts where the aforesaid bevel wheels and their bearings are positioned.

A series of clutch plates 26 is provided on each side of the annular portion 18 of the above mentioned carrier unit, alternate plates of both series being splined to the intermediate flanged portion 17 of the carrier whilst alternate plates of the right hand series (as seen in Figure 1) are splined to an annular flange 27 extending from the main driving plate 2 and alternate plates of the other series are splined to an annular flange 28 extending from the main driven plate 13.

In the arrangement illustrated, the inner plates of the series of clutch plates 26, 26, make direct contact with the annular portion 18 of the carrier unit so that in effect a unitary clutch is formed such plates being urged into driving engagement by means of thrust pins, only one of which, designated 29, appears in the drawings, said pins bearing against a thrust washer 30. This thrust washer is preferably an expanding washer, i. e. in the event of the clutch slipping there is angular displacement of the two washers of the bearing and the balls therebetween tend to ride out of their slots so separating the washers to a greater extent and urging the clutch plates more tightly together.

The aforesaid pins 29 are actuated by means of cams one of which is designated 31 in Figure 1 and as shown this cam is mounted so that it can turn about a pin 32 carried by a lug 33 on the main driving plate 13 and includes teeth 34 engaging with the teeth 36 of a sleeve 35 slidably mounted on the driven shaft 5.

The sleeve 35 is provided with a groove 37 making engagement with a thrust collar (not shown) which collar can be moved longitudinally with respect to the shaft 5 by means of a hand lever 38.

A brake band 39 is provided around the rim 27 of the carrier unit, said rim serving as a brake drum. The ends of said band are provided with pins indicated by dotted circles 40, 41 in Figure 1 and these pins make engagement with a rocking lever 42 located at one side of the transmission unit and rotatable about a pin 43. Said lever 42 serves as a control for the brake, the ends of the band being drawn together when the forward end is raised and vice versa.

The rocking lever 42 controlling the band brake 39 is in turn actuated by a lever 44 movable in unison with the main control lever 38 so that said lever 38 serves as a control for the clutch unit and for the brake unit, engagement between levers 42 and 44 being effected through a roller 44' carried by the former.

The main driving plate 2 is provided with oil cups 44", 44" so that as the assembly rotates oil is scooped up from the lower part of the casing 7 and is fed into the interior of the unit and lubricates the reverse gear train, clutch plates and other moving parts. An oil box 45 is provided at the other end of the unit and serves to collect oil thrown upwardly by the operation of the gear unit, the so collected oil then being fed through nozzles 46, 47 on to the main bearing 6 and control lever mechanism respectively.

If desired means may be provided for ensuring that the friction plates will be properly freed when pressure on the pins 29 is removed, thus for instance a spring disc 48 or the like may be provided for urging the carrier of the clutch assembly towards the left as seen in Figure 1.

In order to avoid any thrust on the engine shaft when the clutch unit is engaged I preferably provide a shoulder or flange 49 extending inwardly from the bore of the bevel wheel 3 and serving as an abutment for the ball race 8 which is held on the shaft 5 by means of a nut 50. Any tendency of the plate 2 to move towards the right in Figure 1 is therefore prevented by means of the engagement of the bevel wheel 3 and ball race 8.

The operation of the above described gear unit is as follows.

Assuming that the control lever 38 is moved towards the right i. e. into the position shown in Figure 1, the cams 31 are rotated and so press the pins 29 towards the left and cause the series of clutch plates 26, 26 to be tightly packed together, the carrier unit 15, 16, 19 also being moved towards the left although there is no displacement of bevel wheels 25, 25 owing to the manner in which the trunnion pins are mounted. If now the shaft 1 is rotating then the drive will be transmitted through the plate 2, clutch plates 26, 26 driven plate 13, and bevel wheel 12 to the driven shaft 5 which will thus be caused to rotate in the forward direction.

If now, the control lever 38 is moved towards the left in Figure 1, the cams 31 will be caused to rotate in a clockwise direction so releasing the pressure on the clutch plates which will become freed and the spring disc 48 will urge the carrier 15, 16, 18 towards the left so ensuring that the plates will be completely freed. Rotation of the shaft 1 will therefore cause rotation of the plate 1 but as the clutch is disengaged no movement will be imparted to the complementary plates. The bevel wheel 3 will also be caused to rotate and the intermediate bevel wheels 25, 25 together with the carrier 15, 16, 18 will therefore run around the bevel wheel 12. This gives the neutral position of the transmission unit.

If the control lever 38 is moved still further to the left in Figure 1 the lever 44 engages with the roller 44' so lifting the lever 42 and tightening the band brake 39. The carrier assembly 19, 16, 15 is therefore brought to rest, i. e. the trunnion pins 23, 23, and bevel wheels 25, 25 are prevented from rotating around the shaft 5. The bevel wheel 12 and the shaft 5 to which it is keyed are therefore caused to turn in a direction opposite to that of the bevel wheel 3 and reverse running is attained.

In the course of time the clutch plates 26, 26 may become worn but any consequent adjustment may be easily effected by moving the plate 13 towards the right in Figure 1. The nut 14 serves as the means for adjusting the position of said plate 13 and openings are provided in the overhanging part of the sleeve 35 so that access to said nut may be readily obtained.

It will be readily appreciated from the foregoing that during forward running of the transmission unit no thrust or torque is applied to the reverse gear train. Indeed the intermediate wheels 25, 25 could be removed and the unit would still act perfectly satisfactorily as a clutch unit.

Whilst I have hereinbefore described a transmission unit according to the present invention it will be readily appreciated by those skilled in the art that many detailed alterations may be made without departing from the scope of such invention and I therefore do not wish to be restricted to such specific embodiment.

I claim:—

1. A clutch and reverse gear transmission unit comprising a main driving assembly including a main driving shaft, a main driving plate fast with said shaft and a main driving bevel wheel secured to said main driving plate, a main driven assembly including a main driven shaft having a bearing in said main driving bevel wheel, a main driven bevel wheel keyed to said main driven shaft and spaced from said main driving wheel, a main driven plate slidably keyed to the hub of said main driven bevel wheel, a carrier unit slidably mounted on said main driven shaft between said main driving and main driven plates and bevel wheels, a series of clutch plates non-rotatably fitted to said carrier and cooperating with complementary friction plates non-rotatably fitted to said main driving plate and main driven plate respectively, a series of planet bevel wheels engaging with said main driving and main driven bevel wheels, trunnion pins radially disposed with respect to said main driving shaft and serving as bearing pins for said planet bevel wheels, said trunnion pins being so mounted in said carrier unit that the latter can move longitudinally along the main driven shaft without displacing said trunnion pins, means for urging said clutch plates into tight contact for effecting forward running of the transmission unit, a brake band associated with said carrier unit and means for controlling said brake band to prevent rotation of said carrier unit at will and thereby effect astern running of said transmission unit.

2. A transmission unit comprising a main driving shaft, a main driven shaft coaxially arranged with respect to said main driving shaft, a main driving plate fast with the end of the main driving shaft, a main driving gear wheel bolted to said main driving plate, a main driven bevel wheel keyed to said main driven shaft and spaced from said main driving bevel wheel, a hub portion extending from said main driven bevel wheel in a direction away from said main driving bevel wheel, a main driving plate secured to said hub portion, a carrier unit slidably mounted on the main driven shaft between said main driving and main driven bevel wheels, longitudinally disposed slipways provided in said carrier, axially disposed trunnion pins carried in said slipways, intermediate planet bevel wheels carried on said trunnion pins and serving to interconnect said main driving and main driven bevel wheels, a rim portion provided on said carrier unit, said rim portion serving as a brake drum, a brake band around said drum, means for actuating said brake band and preventing orientation of said planet wheels at will and so effecting astern operation of the unit, a series of clutch plates making positive engagement with said carrier unit at a part intermediate said rim portion and slipways, a series of complementary clutch plates making positive engagement with said main driving plate, a series of complementary clutch plates making engagement with said main driven plate and means for urging said plates into driving interengagement at will for effecting forward operation of said transmission unit.

3. A transmission unit comprising a main driving shaft, a main driven shaft coaxial with said main driving shaft, a gear wheel fast with the end of the main driving shaft, a gear wheel keyed to the main driven shaft but spaced from said main driving gear wheel, intermediate planet wheels interconnecting said main driving and driven wheels, axially disposed trunnion pins supporting said planet wheels, a carrier unit mounted on said driving shaft between said main driving and main driven gear wheels, slipways in said carrier serving to support said trunnion pins and permit of longitudinal sliding movement of said carrier with respect to said pins, braking means associated with said carrier whereby to prevent orientation of said trunnion pins about said driving shaft and so to give astern operation of the unit, a clutch unit associated with said driving and driven shafts and embracing said reverse gearing, and means for bringing said clutch into operation at will in order to effect direct coupling of the driving and driven shafts and so to give forward operation of the transmission unit.

4. A transmission unit comprising a main driving shaft, a main driven shaft coaxially arranged with respect to said main driving shaft, a main driving plate secured to or integral with the end of the said driving shaft, a main driving bevel wheel secured to said main driving plate, a main driven bevel wheel keyed to said main driven shaft and spaced from said main driving bevel wheel, a main driven plate non-rotatably secured with respect to said main driven bevel wheel but longitudinally slidable with respect thereto, a carrier unit freely mounted on the main driving shaft between said main driving and main driven bevel wheels, a plurality of radially disposed trunnion pins mounted in said carrier unit in such a manner that said carrier can move along the supporting shaft without displacing said pins, planet bevel wheels mounted on said pins interconnecting said main driving and main driven bevel wheels, a brake band associated with said carrier unit, means for operating said band at will in order to prevent orientation of said planet wheels and so cause astern operation of the main driven shaft, annular clutch plates non-rotatably secured to said carrier and cooperating with complementary plates non-rotatably secured to the main driving plate and to the main driven plate respectively, and means for moving said plates into and out of driving interengagement at will in order to effect forward operation of the main driven shaft, said brake mechanism and clutch unit being operable from a common control which in one position engages the clutch and frees the brake mechanism thereby giving forward operation, in another position frees the clutch and applies the brake mechanism thereby giving astern operation and in a third position frees the clutch and brake mechanisms thereby giving a neutral condition of the unit.

ALFRED GEORGE LANGDON.